United States Patent
Arcangeli et al.

(10) Patent No.: US 11,194,615 B2
(45) Date of Patent: Dec. 7, 2021

(54) DYNAMIC PAUSE EXITING

(71) Applicant: Red Hat, Inc., Raleigh, NC (US)

(72) Inventors: Andrea Arcangeli, New York, NY (US); Bandan Das, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 61 days.

(21) Appl. No.: 16/704,133

(22) Filed: Dec. 5, 2019

(65) Prior Publication Data

US 2021/0173684 A1    Jun. 10, 2021

(51) Int. Cl.
*G06F 9/455* (2018.01)
*G06F 11/30* (2006.01)
*G06F 11/07* (2006.01)

(52) U.S. Cl.
CPC ...... *G06F 9/45558* (2013.01); *G06F 9/45545* (2013.01); *G06F 11/0757* (2013.01); *G06F 11/301* (2013.01); *G06F 2009/45575* (2013.01); *G06F 2009/45591* (2013.01)

(58) Field of Classification Search
CPC ............. G06F 9/45558; G06F 9/45545; G06F 11/0757; G06F 11/301; G06F 2009/45591; G06F 2009/45575
See application file for complete search history.

(56) References Cited

U.S. PATENT DOCUMENTS

| | | |
|---|---|---|
| 9,021,498 B1 | 4/2015 | Thimmappa |
| 9,176,764 B1 | 11/2015 | Jorgensen |
| 10,191,741 B2 | 1/2019 | Dice et al. |
| 10,374,651 B1* | 8/2019 | Sivakumar ............. H03L 7/093 |
| 2005/0076186 A1* | 4/2005 | Traut .................. G06F 9/45558 712/1 |
| 2009/0077361 A1* | 3/2009 | Neiger ................ G06F 9/45533 712/241 |
| 2013/0007323 A1* | 1/2013 | Arges ...................... G06F 9/526 710/200 |
| 2015/0128134 A1* | 5/2015 | Thimmappa .......... G06F 9/4555 718/1 |

(Continued)

FOREIGN PATENT DOCUMENTS

CN    103744728 B    2/2017

OTHER PUBLICATIONS

Tianxiang Milao, FlexCore: Dynamic Virtual Machine Scheduling Using VCPU, Feb. 2015 (Year: 2015).*

(Continued)

*Primary Examiner* — Dong U Kim
(74) *Attorney, Agent, or Firm* — Haynes and Boone, LLP (57) ABSTRACT

A method performed by a physical computing system includes, with a hypervisor, determining a first time difference between when pause exiting was last enabled for the virtual machine and present time. The method further includes, with the hypervisor, in response to determining that the first time difference is greater than an enablement threshold, enabling pause exiting. The method further includes, with the hypervisor, with pause loop exiting enabled, determining a second time difference between when pause exiting was last disabled and the present time. The method further includes, with the hypervisor, disabling pause exiting in response to determining that the second time difference exceeds a disablement threshold.

20 Claims, 5 Drawing Sheets

(56) References Cited

U.S. PATENT DOCUMENTS

2019/0011895 A1 1/2019 Butler
2019/0121656 A1 4/2019 Hoppert

OTHER PUBLICATIONS

Bindi Huang, Research on Necessity of Adjusting PLE Configuration, CCIOT 2014 (Year: 2014).*
Estrada; Zachary J., Dynamic VM Dependability Monitoring Using Hypervisor Probes, 2014, http://publish.illinois.edu/assured-cloudcomputing/files/2014/03/Dynamic-VM-Dependability-Monitoring-Using-Hypervisor-Probes.pdf.

* cited by examiner

DYNAMIC PAUSE EXITING

BACKGROUND

The present disclosure relates generally to virtual systems, and more particularly, to dynamic pause exiting from virtual machines.

A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes) on one or more virtual processors.

A host machine (e.g., computer or server) is typically enabled to simultaneously run one or more virtual machines, where each virtual machine may be used by a local or remote client. The host machine allocates a certain amount of execution time from the host's physical processors to each of the virtual processors. Each virtual machine may use the allocated resources to execute applications, including operating systems known as guest operating systems. It is desirable to improve the manner in which virtual machines are managed.

SUMMARY

A method performed by a physical computing system includes, with a hypervisor, determining a first time difference between when pause exiting was last enabled for the virtual machine and present time. The method further includes, with the hypervisor, in response to determining that the first time difference is greater than an enablement threshold, enabling pause exiting. The method further includes, with the hypervisor, with pause loop exiting enabled, determining a second time difference between when pause exiting was last disabled and the present time. The method further includes, with the hypervisor, disabling pause exiting in response to determining that the second time difference exceeds a disablement threshold.

A method includes, with a hypervisor, enabling pause exiting in response to determining that a first time difference since pause exiting was last enabled and present time is greater than an enablement threshold. The method further includes, with the hypervisor, disabling pause exiting in response to determining that a second time difference since pause exiting was last disabled is greater than a disablement threshold. The disablement threshold is smaller than the enablement threshold.

A computing system includes a processor and a memory with machine readable instructions that when executed by the processor, cause the system to read an instruction stream for a virtual machine and in response to finding a pause instruction in the instruction stream, determine a first time difference between when pause exiting was last enabled for the virtual machine and present time. The system is further to enable pause exiting in response to determining that the first time difference is greater than an enablement threshold. The system is further to, with pause loop exiting enabled, determine a second time difference between when pause exiting was last disabled and the present time. The system is further to, disable pause exiting in response to determining that the second time difference exceeds a disablement threshold.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to improve the manner in which virtual machines are managed. Virtual machines are typically managed by a hypervisor. The hypervisor manages which virtual machine gets execution time on the physical processor. Virtual machines may use a variety of mechanisms to help the hypervisor manage virtual machine execution time. One such mechanism is for a virtual machine to use a pause function. The pause instruction creates a delay that acts as a hint to the physical processor that a context switch may be beneficial.

In some examples, the pause instruction may be used during a spin lock. In a spin lock, a virtual machine may be waiting on a resource that is currently locked by another virtual machine. For example, another virtual machine may put a lock on a region of memory while it is accessing that memory so that there are no conflicts with other virtual machines. When a virtual machine is waiting on a resource, it may execute the pause instruction. This puts the virtual processor of that virtual machine in a state in which it is not performing any operations. In some cases, a virtual processor may execute a pause loop while it continually checks to see if the resource it needs is freed up. This is referred to as a spin lock. A spin lock can waste valuable processing time.

Some physical processors have a mechanism that controls when the processor will exit the context of the virtual machine if a pause instruction is executed. However, such hardware features limit this to situations where the software executing on the virtual machine has a Current Privilege Level (CPL) of zero, which is the highest privilege level. Software without this privilege level are not able to use this feature.

To allow for software without this privilege level, and to improve the efficiency at which virtual machines are managed, the principles described herein are directed to methods and systems for providing a software approach to dynamic pause loop exiting. Specifically, when the processor enters the context of a virtual machine, the hypervisor checks to see if a dynamic pause exiting feature is enabled. If the dynamic pause exiting feature is disabled, then the hypervisor scans the instructions to be processed by the virtual machine to look for a pause instruction. If a pause instruction is detected, the hypervisor determines whether the time since the dynamic pause exiting feature was last enabled exceeds a threshold. If so, then the dynamic pause exiting feature is enabled.

If, at the virtual machine entry, the hypervisor determines that the dynamic pause exiting feature is enabled and a certain amount of time has elapsed since the dynamic pause exiting feature was last disabled, then the hypervisor will disable the dynamic pause exiting feature. By tuning the thresholds for enabling and disabling the dynamic pause exiting feature, the processor may work more efficiently. For example, if the dynamic pause exiting feature is enabled for too much time, this may cause too many virtual machine exits. However, if the dynamic pause exiting feature is not enabled enough, then there won't be enough virtual machine exits when the virtual machine is spinning on a lock. Thus, by tuning the various thresholds for enabling and disabling the pause exiting feature, the system is able to more efficiently manage computing resources.

Figure 1:
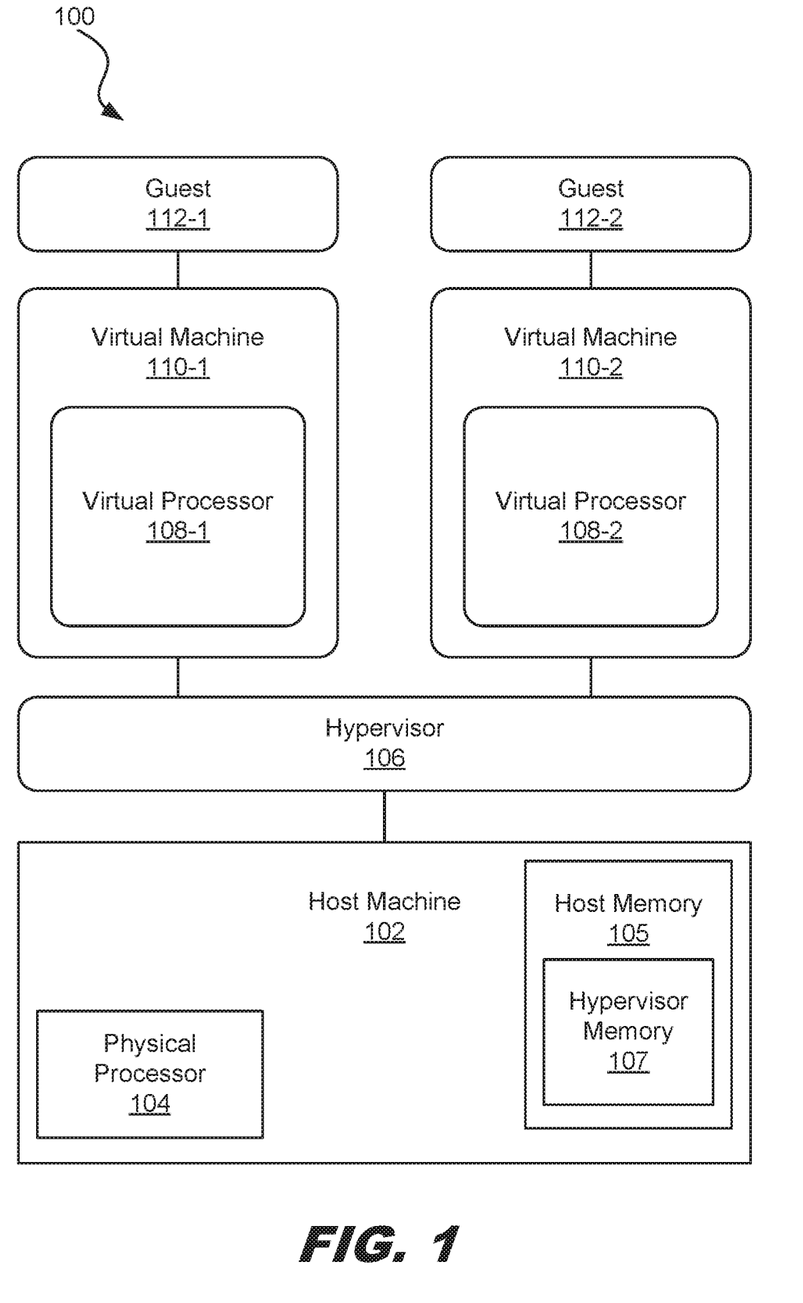
FIG. 1 is a diagram showing an illustrative host system running a plurality of virtual machines, according to one example of principles described herein.

FIG. 1 is a diagram showing an illustrative system 100 involving a plurality of virtual machines 110. According to the present example, a physical system, such as a host machine 102 includes hardware such as a set of processors 104 and a memory 105. The host machine 102 also includes a number of network devices 103. The system 100 also includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure. The virtual machines provide the guest operating systems 112 with a virtual platform on which to operate.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run different type of operating system than another guest 112-2 being run on the same host machine 102. Additionally, the operating system associated with a guest 112 running on a virtual machine 110 may be different from the host operating system running on the host machine 102.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110.

The host memory 105 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software and data. The host memory 105 may designate various blocks of memory for use by the hypervisor 106 or for use by the virtual machines 110. Such designated blocks of memory are referred to as hypervisor memory 107. These blocks of memory may be ranges of physical memory addresses or virtual memory addresses.

The host machine 102 also includes a processor 104 for executing software (e.g., machine readable instructions) and using or updating data stored in memory 105. The software may include an operating system, the hypervisor 106 and various other software applications. The processor 104 may include one or more processors acting in concert.

In the example illustrated in FIG. 1, virtual machines 110 are platforms on which the guests 112 run. The virtual machines 110 include virtual processors 108 which are designed to appear to the guests 112 as physical processors. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The virtual machines 110-1 also include virtual network devices 109. Thus, when the guest 112 transmits or receives information from another entity, it does so through the virtual network device 109. The hypervisor 106 maps the virtual network devices 109 associated with the virtual machines 110 to one of the physical network devices 103 of the host machine 102. For example, the hypervisor 106 may map one virtual network device 109-1 to one network device 103 of the host machine and map a different virtual network device 109-2 to either the same or a different network device 103 of the host machine 102.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual processors 108 and the hypervisor 106. A virtual machine exit marks the point at which a context switch occurs between the virtual processor 108 currently running and the hypervisor 106, which takes over control for a particular reason. During the context switch, the processor 104 may save a snapshot of the state of the virtual processor that was running at the time of exit. The virtual machine exit is handled by the hypervisor 106, which decides the appropriate action to take and then transfers control back to the virtual processor 108 via a virtual machine entry. A virtual machine entry marks the point at which a context switch occurs between the hypervisor 106 and a virtual processor 108, which takes over control.

The network devices 103 are used to transmit data to other computing devices. The network devices 103 may be hard-wire devices for transmitting data over Ethernet or fiber optic cables. Additionally, the network devices 103 may include wireless devices that transmit data using radio waves or other wireless communication technologies. In some examples, multiple network devices may be bonded. For example, multiple network devices may share the same Internet Protocol (IP) address. The bonded network devices utilize a bonding driver.

Figure 2:
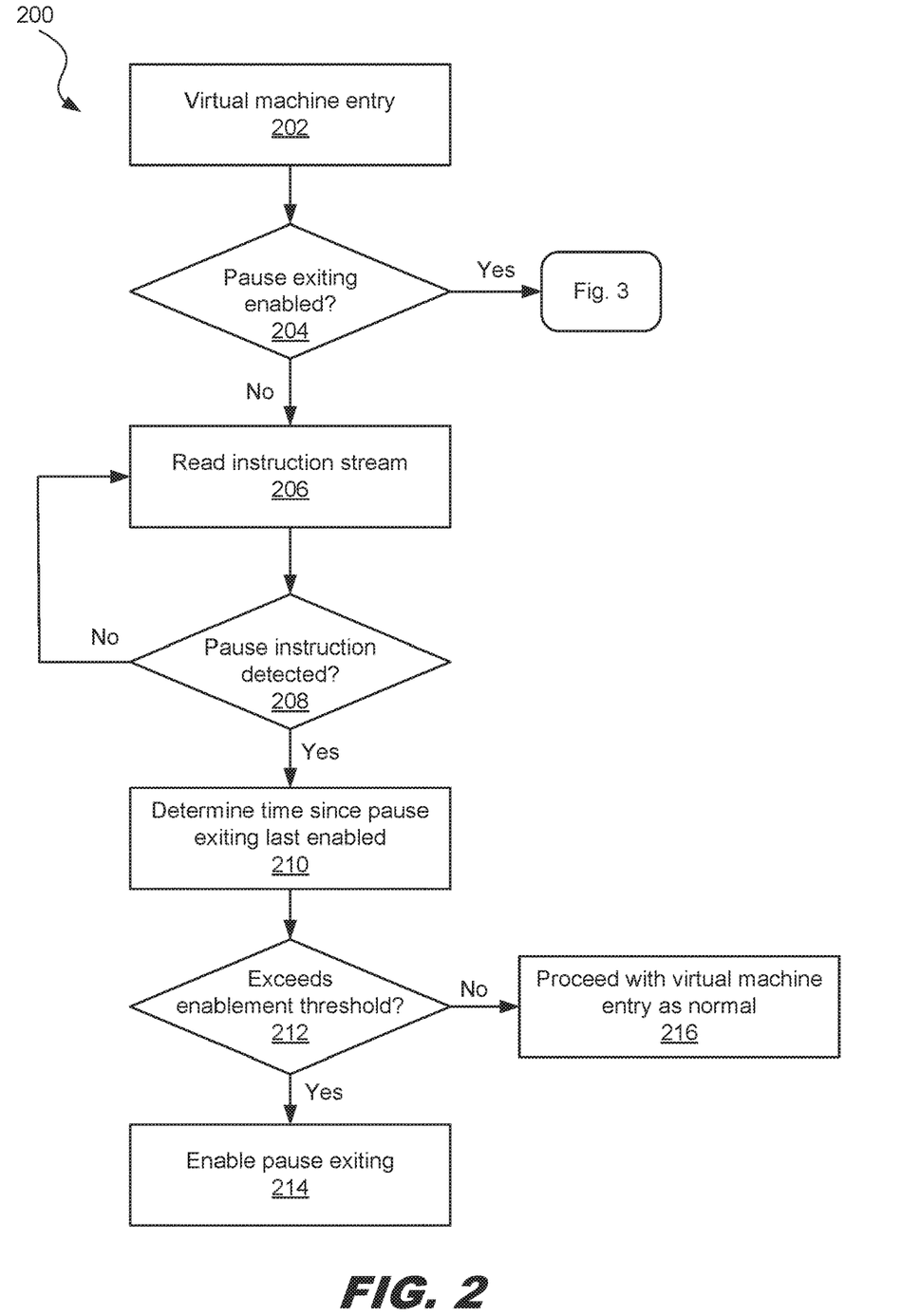
FIG. 2 is a flowchart showing an illustrative method for determining when to enable a pause exiting feature, according to one example of principles described herein.

FIG. 2 is a flowchart showing an illustrative method for determining when to enable a pause exiting feature. According to the present example, the method 200 includes a process 202 at which the hypervisor causes the physical processor to enter the context of a virtual machine. This may be a multi-step process. Specifically, the hypervisor may perform a number of tasks such as saving the processor state associated with its current context and loading the processor state for the virtual machine context. A hypervisor may use an internal data structure to store information relating to a specific virtual machine. One such piece of data may be a dynamic pause exit bit that indicates whether the dynamic pause exiting feature is enabled or disabled. For example, a zero bit may indicate that the dynamic pause exiting feature is disabled and a one bit may indicate that the dynamic pause exiting feature is enabled.

The method 200 further includes a process for determining whether the pause exiting feature is enabled or not. This may be done, for example, by checking the specific bit in the internal data structure. If pause exiting is enabled, then the method will proceed to the steps illustrated in FIG. 3 and described below. However, if pause exiting is disabled, then the method 200 proceeds to process 206.

At process 206, the hypervisor reads the instruction stream for the virtual machine. Specifically, as part of the virtual machine entry process, the hypervisor determines the memory location at which to start fetching instructions for execution. The hypervisor may then scan the stream of instructions that follow that instruction. In some examples, the hypervisor may scan an entire thread. In some examples, however, the hypervisor may only scan a sub-portion of the thread. The size of the stream that is scanned may be set by a user.

At process 208, while reading the instruction stream, the hypervisor determines whether the instruction stream includes a pause instruction. In some examples, the hypervisor may look for a "REP (repeat); NOP (no operation)" instruction as well. If no pause instruction is found, then the hypervisor continues to read the instruction stream at process 206. However, if a pause instruction is found, then the method 200 proceeds to process 210.

At process 210, the hypervisor determines the amount of time that has passed since the pause exiting feature was last enabled for the virtual machine. This may be done, for example, by looking at a variable stored in an internal data structure. That variable may include a time stamp of the last time that the pause exiting feature was enabled. In some examples, if the pause exiting feature was never enabled since the virtual machine was spun up, then this variable may include the spin-up time rather than the last time the pause exiting feature was enabled. In some examples, however, when a virtual machine is first spun up, it may have the pause exiting feature enabled by default. Thus, the pause exiting feature will have been enabled previously and would have been disabled using logic that will be described in further detail below.

At process 212, the hypervisor determines whether the amount of time since the pause exiting feature was last enabled exceeds an enablement threshold. In one example, the enablement threshold may be within a range of about 50-200 milliseconds. Other time ranges are contemplated. If it is determined at process 212 that the time since pause exiting was last enabled does not exceed the enablement threshold, then the hypervisor will proceed with the virtual machine entry as normal at process 216.

If, however, the hypervisor determines at process 212 that the time since pause exiting was last enabled exceeds the enablement threshold, then the method 200 proceeds to process 214. At process 214, the hypervisor enables pause exiting. The enablement threshold is set to be sufficiently long so that the pause exiting feature is not enabled too much. If the pause exiting is enabled too much, then the virtual machine may be exiting more often than is efficient.

Figure 3:
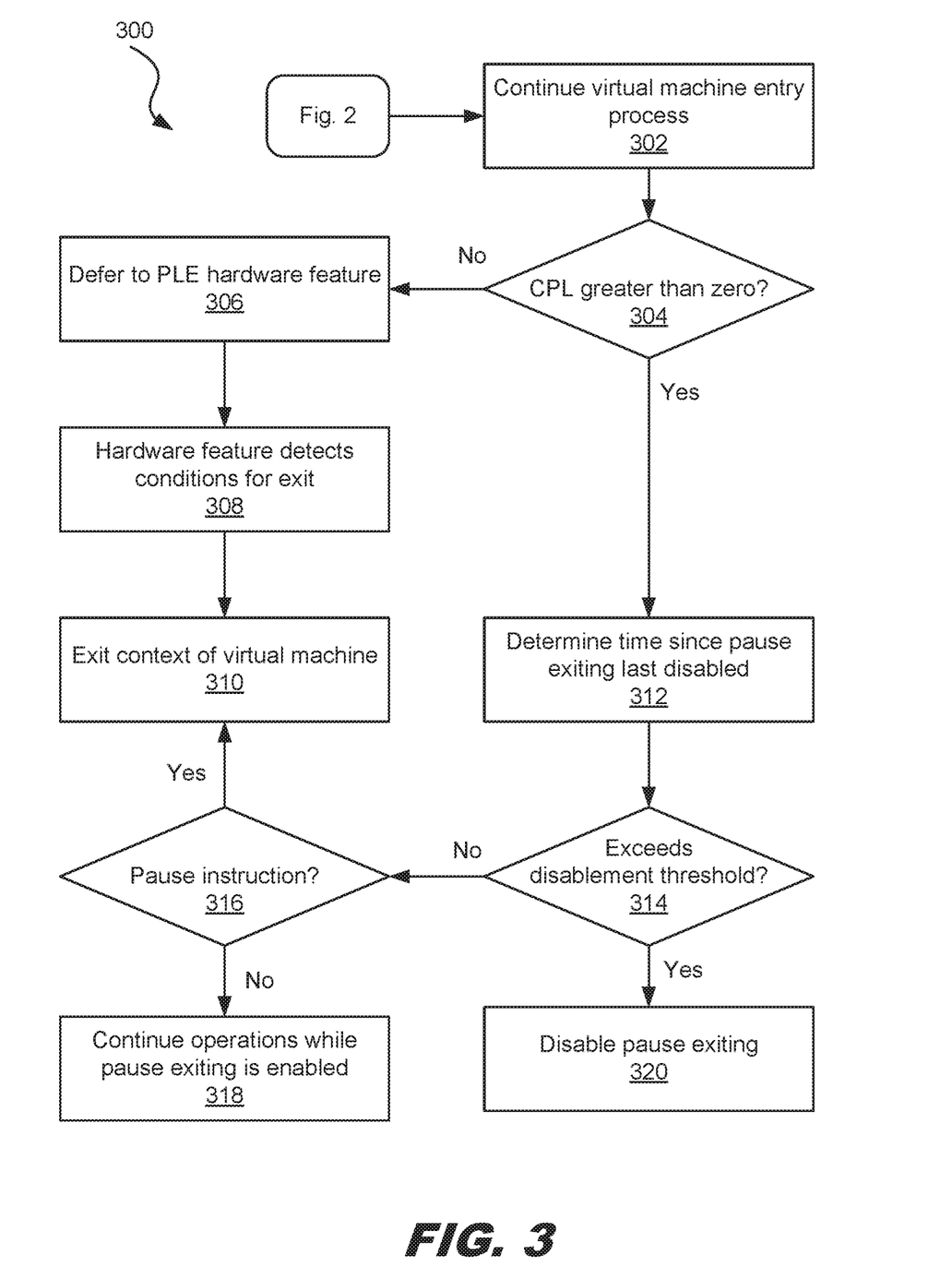
FIG. 3 is a flowchart showing an illustrative method for determining when to disable a pause exiting feature, according to one example of principles described h.

FIG. 3 is a flowchart showing an illustrative method 300 for determining when to disable a pause exiting feature. According to the present example, the method 300 includes a process 302 for continuing the virtual machine entry process after determining that the pause exiting feature has been enabled.

As part of the virtual machine entry process, at 304, the hypervisor determines whether the software being executed by the virtual machine has a CPL greater than zero. The CPL is a privilege level used by processor architectures in order to determine which permissions a particular piece of software has to various resources. For example, some software may have access to privileged portions of memory. In x86 process architecture, there are four privileges levels ranging from zero to three. Zero is the most privileged and three is the least privileged. Generally, resources available to lower privilege levels are also available to higher privilege levels.

As mentioned above, some processors may include a hardware feature referred to as pause loop exiting. This is a hardware feature that forces a virtual machine exit in response to detecting a pause instruction as well as some additional factors. If it is determined at process 304 that the current software has a privilege level of zero, or otherwise has this hardware feature available to it, then the method 300 proceeds to process 306.

At process 306, the hypervisor defers pause exiting techniques to the hardware, which generally means that the hypervisor causes a virtual machine exit when a pause instruction is detected. In other words, the hypervisor does not take any additional steps related to using the dynamic pause exiting feature and instead lets the hardware determine when and whether to force a virtual machine exit. Thus, the dynamic pause exiting logic (e.g., steps 312, 314, 320) is ignored. The hypervisor then finishes the virtual machine entry process and the virtual machine begins execution.

At process 308, the hardware feature detects a condition for exit. This may be because the hardware detected a pause instruction, and/or there has been a threshold period of time between the last function call and the current time. These conditions may be indicative of a spinlock. As mentioned above, a spinlock occurs when the software is waiting for access to a particular resource that is currently locked by another virtual machine or other process. Thus, the virtual machine may be spinning in a loop until that resource is unlocked. In response to detecting these conditions, the hardware will cause a virtual machine exit at process 310.

If, however, at process 304, the hypervisor determines that the CPL is greater than zero, or the software being executed on the virtual machine does not otherwise have access to the pause loop exiting hardware feature, than the method 300 proceeds to process 312. In some examples, however, even if the CPL is zero, the system may be configured to use the logic described below rather than the steps (306, 308) described above. At process 312, the hypervisor determines the amount of time (or time difference) since the dynamic pause exiting feature was last disabled. The hypervisor may also use an internal data structure for this process. Specifically, the internal data structure may include a variable with a time stamp indicating the most recent time in which the dynamic pause exiting feature switched from being disabled to being enabled. Thus, the hypervisor may compare the current time with this time stamp to determine the amount of time that has passed since then.

At process 314, the hypervisor determines whether the amount of time since the dynamic pause exiting feature was last disabled exceeds a disablement threshold. The disablement threshold may range between 20 and 100 milliseconds, for example. Other time ranges are contemplated. The disablement threshold may be tuned so as to limit the amount of time in which the virtual machine uses the dynamic pause exiting feature. Use of the dynamic pause exiting feature too often may result in too many virtual machine exits which may downgrade efficiency. In general, the disablement threshold may be smaller than the enablement threshold.

If it is determined at process 314 that the amount of time since the dynamic pause exiting feature was last disabled exceeds a disablement threshold, then the method 300 proceeds to process 320, at which the dynamic pause exiting feature is disabled. The virtual machine entry process then continues as normal. After completion of the virtual machine entry process, the virtual machine continues to execute instructions as normal without the pause exiting feature enabled.

However, if it is determined at process 314 that the amount of time since the dynamic pause exiting feature was last disabled does not exceed the disablement threshold, then the method 300 keeps the pause exiting feature enabled and completes the virtual machine entry process. Afterwards, at process 316, the virtual machine executes a pause instruction. In response to detecting the pause instruction, the hypervisor causes a virtual machine exit, at process 310. If, however, no pause instruction is detected, the virtual machine continues operations as normal with pause exiting enabled, at process 318.

Using the techniques described above, pause exiting is available to pieces of software that do not have the highest CPL level or otherwise have access to pause exiting hardware features. Moreover, the parameters of the dynamic pause exiting thresholds may be tuned for better performance. For example, a user may set the enablement threshold and disablement threshold at various values in order to maximize performance. In some examples, data may be collected and analyzed to determine the ideal threshold values and set those values. The enablement and disablement thresholds may be unique to a specific piece of software or may be unique to a specific virtual machine. The enablement and disablement threshold may also be dynamically updated based on various performance metrics that are collected. For example, if too many virtual machine exits are occurring, then the enablement or disablement thresholds may be adjusted accordingly. Conversely, if threads are waiting on spinlocks too often and not exiting because the pause exiting feature stays disabled too long, then the thresholds may be updated accordingly.

Figure 4:
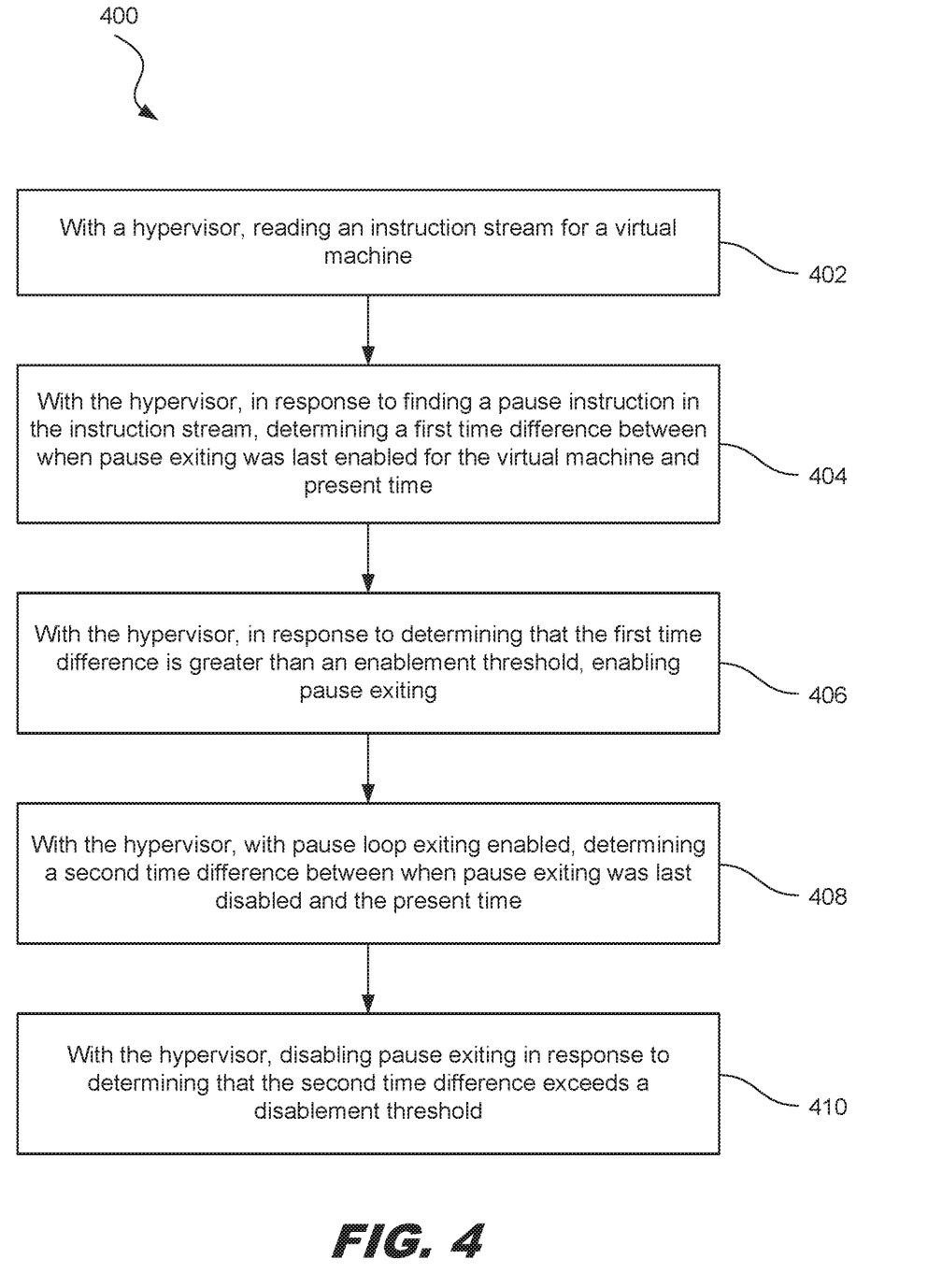
FIG. 4 is a flowchart showing an illustrative method for dynamic pause exiting, according to one example of principles described herein.

FIG. 4 is a flowchart showing an illustrative method for dynamic pause exiting. According to the present example, the method 400 includes a process 402 for, with a hypervisor, reading an instruction stream for a virtual machine. As mentioned above, this may be done during the virtual machine entry process. The hypervisor may read the entire stream for a particular thread or may read a sub-portion of that thread.

The method 400 further includes a process 404 for, with the hypervisor, in response to finding a pause instruction in the instruction stream, determining a first time difference between when pause exiting was last enabled for the virtual machine and present time. This may be determined based on a time stamp stored in the internal data structure.

The method 400 further includes a process 406 for, with the hypervisor, in response to determining that the first time difference is greater than an enablement threshold, enabling pause exiting. The enablement threshold may be tuned for a specific virtual machine, thread, or piece of software.

The method 400 further includes a process 408 for, with the hypervisor, with pause loop exiting enabled, determining a second time difference between when pause exiting was last disabled and the present time. This may be determined based on a time stamp within the internal data structure.

The method 400 further includes a process 410 for, with the hypervisor, disabling pause exiting in response to determining that the second time difference exceeds a disablement threshold. The disablement threshold may be tuned for a specific virtual machine, thread, or piece of software.

Figure 5:
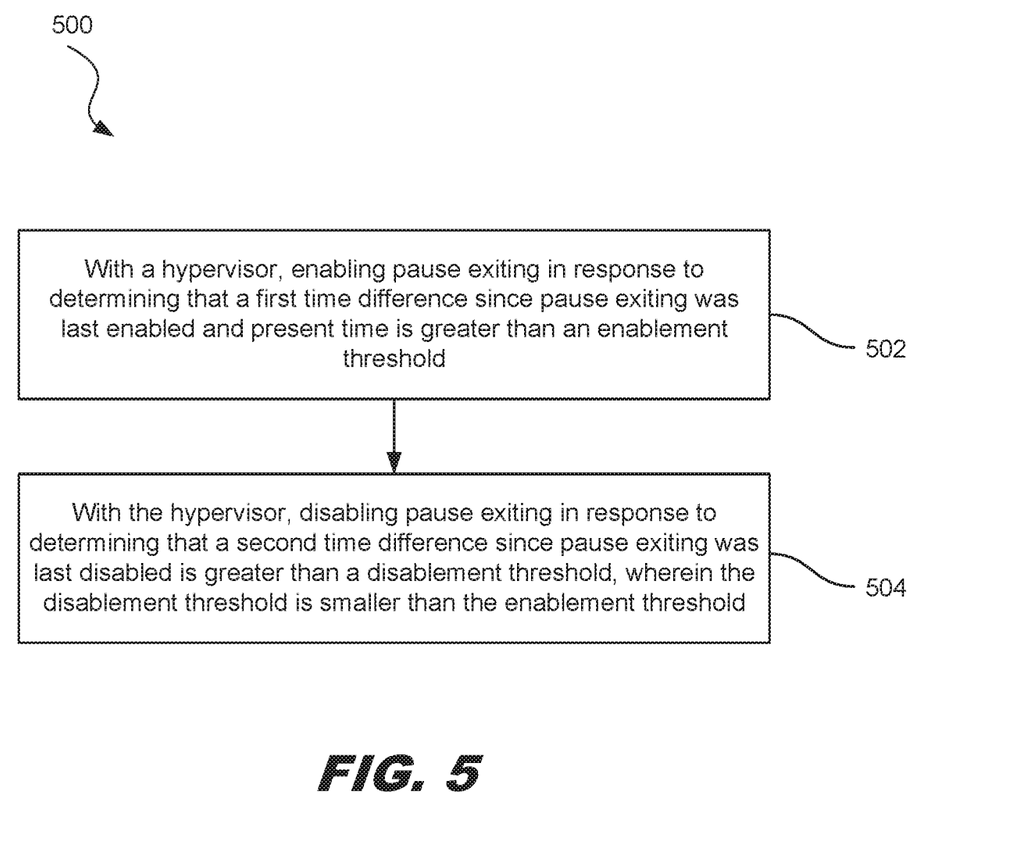
FIG. 5 is a flowchart showing an illustrative method for enabling and disabling pause exiting, according to one example of principles described herein.

FIG. 5 is a flowchart showing an illustrative method for enabling and disabling pause exiting. According to the present example, the method 500 includes a process 502 for, with a hypervisor, enabling pause exiting in response to determining that a first time difference since pause exiting was last enabled and present time is greater than an enablement threshold. The method 500 further includes a process 504 for, with the hypervisor, disabling pause exiting in response to determining that a second time difference since pause exiting was last disabled is greater than a disablement threshold. In some examples, the disablement threshold is smaller than the enablement threshold.

Some examples of processing systems described herein may include non-transient, tangible, machine readable media that include executable code that when run by one or more processors (e.g., processor 104) may cause the one or more processors to perform the processes of the methods described above. Some common forms of machine readable media that may include the processes of the methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:
1. A method comprising:
with a hypervisor, determining a first time difference between when pause exiting was last enabled for the virtual machine and present time;

with the hypervisor, in response to determining that the first time difference is greater than an enablement threshold, enabling pause exiting;

with the hypervisor, with pause loop exiting enabled, determining a second time difference between when pause exiting was last disabled and the present time; and with the hypervisor, disabling pause exiting in response to determining that the second time difference exceeds a disablement threshold.

2. The method of claim 1, wherein the hypervisor enables pause exiting in response to finding a pause instruction in an instruction stream of the virtual machine.

3. The method of claim 1, wherein the hypervisor enables pause exiting in response to a pre-defined time-out.

4. The method of claim 1, further comprising, while pause exiting is enabled, exiting a context of the virtual machine in response to executing a pause instruction for the virtual machine.

5. The method of claim 1, wherein, while pause exiting is enabled, the determining the second time difference is done in response to determining that a Current Privilege Level (CPL) of software executing on the virtual machine is greater than zero.

6. The method of claim 1, wherein the disablement threshold is smaller than the enablement threshold.

7. The method of claim 1, wherein the disablement threshold is within a range of about 20 and 100 milliseconds.

8. The method of claim 1, wherein the enablement threshold is within a range of about 50 and 200 milliseconds.

9. The method of claim 1, wherein pause exiting is enabled or disabled by changing a value in an internal data structure managed by the hypervisor.

10. The method of claim 1, wherein a pause instruction is executed while waiting on a spinlock.

11. A method comprising:
with a hypervisor, enabling pause exiting in response to determining that a first time difference since pause exiting was last enabled and present time is greater than an enablement threshold;
with the hypervisor, disabling pause exiting in response to determining that a second time difference between the present time and when pause exiting was last disabled is greater than a disablement threshold; and
wherein the disablement threshold is smaller than the enablement threshold.

12. The method of claim 11, further comprising, while pause exiting is enabled, exiting a context of the virtual machine in response to executing a pause instruction for the virtual machine.

13. The method of claim 11, further comprising, in response to determining that a Current Privilege Level (CPL) of software executing on the virtual machine is 0, using a hardware feature to cause an exit of the virtual machine.

14. The method of claim 11, wherein, while pause exiting is enabled, the determining the second time difference is done in response to determining that a Current Privilege Level (CPL) of software executing on the virtual machine is greater than zero.

15. The method of claim 11, wherein the disablement threshold is within a range of about 20 and 100 milliseconds.

16. The method of claim 11, wherein the enablement threshold is within a range of about 50 and 200 milliseconds.

17. The method of claim 11, wherein pause exiting is enabled or disabled by changing a value in an internal data structure managed by the hypervisor.

18. A computing system comprising:
a processor; and
a memory comprising machine readable instructions that when executed by the processor, cause the system to:
read an instruction stream for a virtual machine;
in response to finding a pause instruction in the instruction stream, determine a first time difference between when pause exiting was last enabled for the virtual machine and present time;
enable pause exiting in response to determining that the first time difference is greater than an enablement threshold;
with pause loop exiting enabled, determine a second time difference between when pause exiting was last disabled and the present time; and
disable pause exiting in response to determining that the second time difference exceeds a disablement threshold.

19. The system of claim 18, wherein, while pause exiting is enabled, the system is further to defer pause exiting to a pause loop exiting hardware feature in response to determining that a Current Privilege Level (CPL) of software executing on the virtual machine is zero.

20. The system of claim 18, wherein, while pause exiting is enabled, to determine the second time difference is done in response to determining that a Current Privilege Level (CPL) of software executing on the virtual machine is greater than zero.

* * * * *